(12) United States Patent
Feng et al.

(10) Patent No.: US 8,023,245 B2
(45) Date of Patent: Sep. 20, 2011

(54) LIGHTNING STRIKE MITIGATION FOR AIRCRAFT

(75) Inventors: Frank Z. Feng, Loves Park, IL (US); Steven A. Davidson, Pecatonica, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 417 days.

(21) Appl. No.: 12/250,307

(22) Filed: Oct. 13, 2008

(65) Prior Publication Data

US 2010/0091422 A1    Apr. 15, 2010

(51) Int. Cl.
*H05F 3/00* (2006.01)
(52) U.S. Cl. .................................................. 361/218
(58) Field of Classification Search ............ 361/218
See application file for complete search history.

(56) References Cited

U.S. PATENT DOCUMENTS 5,729,059 A * 3/1998 Kilroy et al. ............. 307/84
5,831,842 A * 11/1998 Ogasawara et al. ......... 363/40
6,008,560 A   12/1999 Becerra

FOREIGN PATENT DOCUMENTS
EP    0809346 A1   11/1997

OTHER PUBLICATIONS

Official Extended Search Report and Written Opinion of the European Patent Office counterpart foreign Application No. 09252404.0-2207; filed Oct. 13, 2009.
Official Extended Search Report and Written Opinion of the European Patent Office in counterpart foreign Application No. 02252404.1-2207; filed Oct. 13, 2009.

* cited by examiner

*Primary Examiner* — Dharti H Patel
(74) *Attorney, Agent, or Firm* — Kinney & Lange, P.A.

(57) ABSTRACT

A lightning mitigation system for use on an aircraft employs parasitic capacitance associated with a motor/generator to dissipate voltage provided as a result of a lightning strike. The motor/generator includes a set of windings defined by an outer periphery and a case that surrounds the set of windings. A parasitic capacitance is defined by the airgap separating the windings of the motor/generator from the case. A motor controller is electrically connected to the set of windings and includes a filter circuit. The filter circuit includes an equivalent capacitance that is selected based on the parasitic capacitance associated with the motor/generator such that a lightning strike results in a large portion of the voltage being dissipated by the parasitic capacitance of the motor/generator.

12 Claims, 2 Drawing Sheets

LIGHTNING STRIKE MITIGATION FOR AIRCRAFT

BACKGROUND

The present invention is related to electrical systems employed by aircraft, and in particular to electrical systems that provide lightning strike mitigation.

By some estimates, each aircraft in the U.S. commercial fleet is struck by lightning at least once a year. The effects of lightning strikes are typically mitigated by the use of electrically conductive materials, such as aluminum, as an exterior component or skin of the aircraft. The electrically conductive material provides a low-resistance path for the lightning to follow, preventing the lightning strike from damaging other components of the aircraft.

The next generation of aircraft employs composite materials to form the frame of the aircraft, such as the fuselage and wings. In addition, the next generation of aircraft has been deemed a 'more electric aircraft', which means the aircraft will rely more heavily on electric systems, as opposed to traditional mechanical and pneumatic systems. The electrical systems, disposed around the airplane, including on the wings and fuselage, provide a low-resistance path that can conduct lightning strikes, potentially damaging the electrical systems on the aircraft not capable of handling high voltages. This risk can be mitigated by the addition of high-voltage filters, but these filters are heavy and expensive, thereby increasing the cost of the aircraft as well as decreasing the fuel-efficiency of the aircraft.

SUMMARY

A lightning mitigation system for electrical systems on an aircraft makes use of parasitic capacitance associated with a motor/generator to mitigate the voltage associated with a lightning strike. The system includes a motor/generator comprised of at least one set of windings and a motor/generator case located a distance d around the outer periphery of the at least one set of windings. The at least one set of windings and the motor case located around the periphery of the case results in a parasitic capacitance being defined between the case and the windings. A motor controller is electrically connected to the at least one set of windings and includes a filter circuit a capacitance that is sized based on the parasitic capacitance associated with the motor/generator case such that the voltage associated with a lightning strike is dissipated, in large part, by the parasitic capacitance associated with the motor case and windings.

DETAILED DESCRIPTION

The present invention provides a novel, inexpensive solution to the problem of mitigating lightning strikes on modern aircraft having exterior structures comprised largely of composite materials that do not provide electrical paths for mitigating lightning. In response to the use of composite materials on the exterior of aircraft, as well as the advent of more electric aircraft that rely on semiconductor components that are sensitive to large voltages caused by lightning strikes, mitigation of lightning strikes has relied on large, heavy, and therefore expensive filters to prevent lightning strikes from damaging electrical components. The present invention obviates the need for large filters by taking advantage of parasitic capacitance formed as a result of the airgap between the motor/generator case and the motor/generator windings. In this way, the present invention provides an inexpensive solution to lightning strike mitigation.

Figure 1:
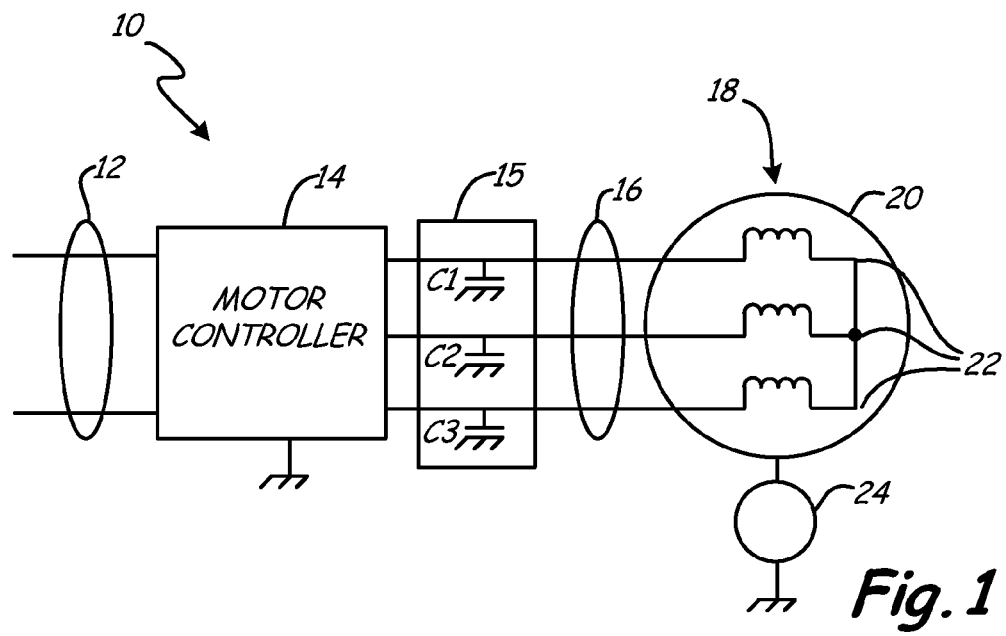
FIG. 1 is a circuit diagram of an electrical system according to an embodiment of the present invention that provides lightning strike mitigation.

FIG. 1 is a circuit diagram of electrical system 10 according to an embodiment of the present invention that provides lightning strike mitigation. System 10 includes direct current (dc) input feeder 12, motor controller 14, electromagnetic interference (EMI) filter 15, alternating current (ac) feeder 16, motor/generator system 18, motor/generator case 20, motor/generator windings 22, and representation of lightning strike voltage 24.

Motor/generator system 18 may operate in both a motor mode and a generator mode. In the motor mode, dc voltage provided by dc input feeder 12 is converted to an ac voltage by motor controller 14. The ac voltage is provided by ac feeder 16 to windings 22 for generating motive force in motor/generator system 18.

Motor controller 14 includes a plurality of semiconductor devices (e.g., transistors) that allow motor controller 14 to selectively convert dc power to ac power (e.g., during the motor mode) or ac power to dc power (e.g., during the generating mode). Voltage surges, such as those caused by lightning strikes, can result in damage to the semiconductor devices. To protect the semiconductor devices from damage, large filters are typically required to absorb or mitigate voltage caused by a lightning strike. In addition, motor controller 14 includes EMI filter 15, which is shown separately in FIG. 1 for ease of illustration, but is typically included as part of motor controller 14. EMI filter 15 is typically employed to remove electromagnetic interference associated with ac power generated by motor/generator 18. In the embodiment shown in FIG. 1, EMI filter 15 includes an individual capacitive element C1, C2, and C3 connected between each phase of power and a ground connection (e.g., typically the chassis of the motor controller).

Figure 3:
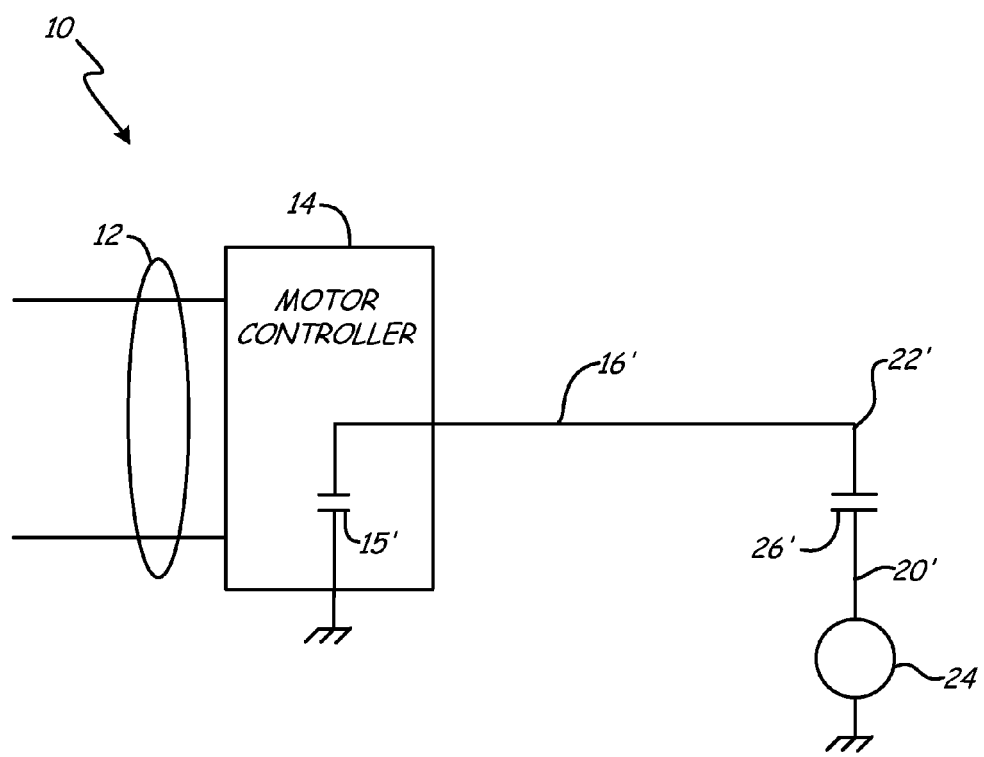
FIG. 3 is a simplified circuit diagram representation of the electrical system according to an embodiment of the present invention that illustrates the lightning strike mitigation provided by the motor/generator.

As described in more detail with respect to FIG. 3, the capacitance associated with EMI filter 15 can be designed in conjunction with the parasitic capacitance associated with motor/generator 18 to provide a capacitive network that results in a majority of the voltage generated as a result of a lightning strike being dissipated by the parasitic capacitance associated with motor/generator 18. In this way, the present invention takes advantage of parasitic capacitance provided as a result of the air gap located between motor/generator case 20 and motor/generator windings 22 to prevent voltage associated with a lightning strike from damaging motor controller 14.

Figure 2:
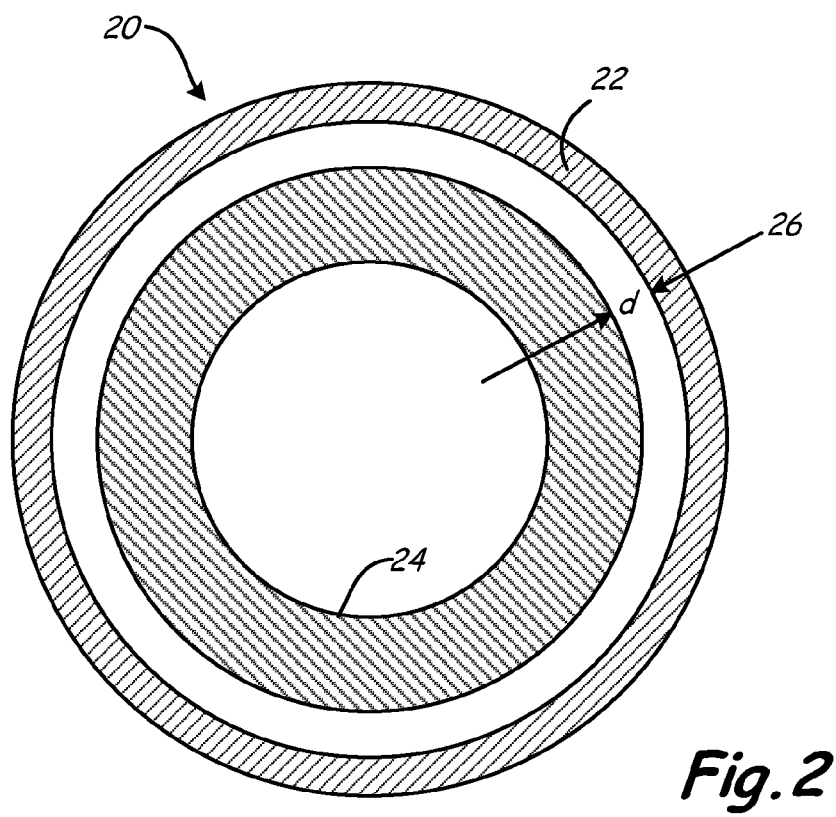
FIG. 2 is a cross-sectional view of a motor/generator according to an embodiment of the present invention illustrating the airgap between the motor/generator case and set of windings.

FIG. 2 is a cross-sectional view of motor/generator 18 according to an embodiment of the present invention. The cross-sectional view illustrates the presence of air gap 26 between motor/generator case 22 and motor/generator windings 24. In this embodiment, the motor/generator windings represent the stator portion of motor/generator 18, wherein a rotor portion (not shown) would be included within the interior portion of the stator.

The parasitic capacitance provided by the combination of motor/generator case 22, motor/generator windings 24 and air gap 26 is dependent on the distance d of air gap 26 and the dielectric or breakdown voltage of air gap 26. In an exemplary embodiment, the distance d of air gap 26 is substantially uniform around the circumference of windings 24. Without a uniform air gap, points along the interior of motor/generator case 22 that extend close to motor/generator windings 24 provide breakdown paths for large voltages. By providing a substantially uniform distance, a uniform parasitic capacitance is provided that is capable of withstanding the high voltages caused by a lightning strike without breakdown of the dielectric (e.g., air) within air gap 26.

In addition, the breakdown voltage associated with air gap 26 can be further increased by circulating the air within motor/generator case 22 and motor/generator windings 24. By circulating air within air gap 26, particles ionized as a result of a large breakdown voltage are removed (as a result of the circulation) from air gap 26. In one embodiment, air is circulated within air gap 26 as a result of the rotation of the rotor (not shown). That is, as the rotor rotates, the air flow developed as a result of the rotation is provided to airgap 26. In this way, ionized particles are removed from airgap 26 prior to formation of an ionized path forming between motor/generator case 22 and motor/generator windings 24.

FIG. 2 illustrates the formation of a parasitic capacitance associated with motor/generator 18. The parasitic capacitance represents half of the capacitive network employed to mitigate the effect of a lightning strike. The remainder of the capacitive network is realized by selectively designing the capacitance associated with EMI filter 15 (as shown in FIG. 1). Typically (although not always), the parasitic capacitance associated with motor/generator 18 cannot be easily modified or varied. Thus, design of the capacitive network often depends on analyzing or experimentally detecting the parasitic capacitance associated with motor/generator 18 and then designing EMI filter 15 to provide a capacitive network that results in the majority of the voltage developed by a lightning strike being mitigated by the parasitic capacitance associated with motor/generator 20.

FIG. 3 is a simplified circuit diagram representation of the electrical system according to an embodiment of the present invention that illustrates selection of the filter circuit associated with motor controller 14 to mitigate the effects of a lighting strike. In particular, the simplified diagram provides a framework by which the desired amount of capacitance can be analyzed using a single point system (i.e., without the multiple phases of ac power) that allows capacitances associated with motor/generator 18 and the filter circuit to be analyzed as a series circuit. To this end, previously introduced components are illustrated in this circuit diagram as a single point and are denoted by the suffix prime. For instance, EMI filter 15 (as shown in FIG. 1) is represented as an equivalent capacitance labeled 15', three-phase ac feeder lines 16 (as shown in FIG. 1) are represented as single-phase line 16', motor/generator case 20 (as shown in FIG. 1) is represented as point 20', motor/generator windings 22 (as shown in FIG. 1) are represented as point 22', and airgap 26 between motor/generator windings 22 and motor/generator case 20 is represented as capacitor 26'.

Analyzed as a single point system, EMI filter 15 can be represented as the sum of each individual capacitive element C1, C2, and C3, allowing EMI filter 15 to be represented as equivalent capacitance 15'. Likewise, the parasitic capacitance associated with motor/generator 18 can be represented as a single capacitive element 26'. The resulting capacitive network is expressed as a series connection of parasitic capacitance 26' and equivalent filter capacitance 15'. Assuming the parasitic capacitance 26' associated with motor/generator 18 is known and fixed, the equivalent filter capacitance 15' can be designed such that the voltage generated as a result of a lightning strike (approximately 6000 V) is dissipated largely by the parasitic capacitance 26'. As a result of the lightning mitigation provided by the capacitive network that includes the parasitic capacitance associated with motor/generator 18, motor controller 14 can be designed without expensive and large filters otherwise required to protect components from a lightning strike.

For example, in an exemplary embodiment the parasitic capacitance provided by the motor case, windings, and airgap is equal to approximately six nanoFarads (nF). In order to mitigate the approximately six-thousand volts provided by a strike of lightning without damage to semiconductor employed by motor controller 14, the equivalent capacitance 15' of the EMI filter is selected to equal approximately three-hundred nF. In this way, approximately 5,800 volts (i.e., 98% of the voltage surge provided by the lightning strike) are dissipated by the parasitic capacitance provided by the case and windings, leaving only approximately 120 volts to be dissipated by the equivalent capacitance 15' associated with the EMI filter.

In this way, the present invention takes advantage of parasitic capacitance associated with motor/generator case and windings to mitigate the effect of lightning strikes. In particular, recognition of the parasitic capacitance provided by the motor/generator case and windings allows filter components employed by motor controller 14 to be appropriately sized such that the majority of the voltage is dissipated by parasitic capacitance of the motor/generator case.

Although the present invention has been described with reference to preferred embodiments, workers skilled in the art will recognize that changes may be made in form and detail without departing from the spirit and scope of the invention.

The invention claimed is:

1. A lightning mitigation system for electrical systems on an aircraft, the lightning mitigation system comprising:
a motor/generator having a rotor portion and a stator portion, wherein the stator includes at least one set of windings having an outer periphery;
a motor/generator case located around the outer periphery of the at least one set of windings and separated by a distance d that defines an airgap between the motor/generator case and the at least one set of windings, wherein a parasitic capacitance associated with the motor/generator is defined, at least in part, by the distance d between the motor/generator case and the at least one set of windings; and
a motor controller having at least one alternating current (ac) input/output electrically connected to the at least one set of windings and further including a filter circuit associated with the at least one ac input/output, wherein the filter circuit has a capacitance that is selected based on the parasitic capacitance associated with the motor/generator such that a lightning strike of the motor/generator results in a majority of the voltage being dissipated by the parasitic capacitance.

2. The lightning mitigation system of claim 1, wherein the distance d defining the airgap between the motor/generator case and the at least one set of windings is substantially uniform.

3. The lightning mitigation system of claim 1, wherein a breakdown voltage associated with the parasitic capacitance is increased as a result of the rotor rotating within the motor/generator, wherein the rotation of the rotor causes air to circulate within the air gap between the at least one set of windings and the motor/generator case.

4. The lightning mitigation system of claim 1, wherein the filter circuit includes at least one capacitive element connected in parallel between the ac input/output of the motor controller and a ground connection, wherein the capacitance associated with the filter circuit is dependent on the capacitance associated with the at least one capacitive element.

5. The lightning mitigation system of claim 1, wherein the filter circuit is an electromagnetic interference (EMI) circuit.

6. The lightning mitigation system of claim 1, wherein the capacitance associated with the filter circuit is greater than the parasitic capacitance associated with the motor/generator.

7. The lightning mitigation system of claim 6, wherein the capacitance associated with the filter circuit is approximately fifty times greater than the parasitic capacitances associated with the motor/generator.

8. A method of designing a lightning mitigation system for use on an aircraft, the method comprising:
    determining a parasitic capacitance value defined by a motor/generator, motor/generator case, and resultant airgap between the motor/generator and motor/generator case; and
    designing a motor controller having a filter circuit for electrical connection with the motor/generator, wherein a capacitance associated with the filter circuit is selected based on the determined parasitic capacitance associated with the motor/generator such that voltage generated as a result of a lightning strike is dissipated in large part by the parasitic capacitance.

9. The method of claim 8, wherein the capacitance associated with the filter circuit is greater than the parasitic capacitance associated with the motor/generator.

10. An electrical system having lightning mitigation capabilities, the system comprising:
    a motor controller having at least one alternating current (ac) input/output and further including a filter circuit associated with the at least one ac input/output having a defined capacitance value; and
    a motor/generator having a rotor portion and a stator portion, the stator portion connected to the ac input/output, and further including a motor/generator case surrounding the stator portion that provides a parasitic capacitance in electrical connection with the ac input/output;
    wherein the capacitance associated with the filter circuit and the parasitic capacitance associated with the motor/generator form a capacitive network, wherein the capacitive network is configured such that a voltage surge caused by a lighting strike is dissipated largely across the parasitic capacitance associated with the motor/generator.

11. The electrical system of claim 10, wherein the capacitive network is configured to dissipate approximately 98% of the voltage surge caused by a lighting strike across the parasitic capacitance associated with the motor/generator.

12. The electrical system of claim 10, wherein an equivalent capacitance representing the capacitance of the filter circuit for each phase of the ac input/output is configured to equal approximately fifty times the equivalent capacitance representing the parasitic capacitance associated with the motor/generator.

* * * * *